United States Patent [19]
Ackermann et al.

[11] 3,875,117
[45] Apr. 1, 1975

[54] PROCESS FOR IMPARTING STABILITY TO POLYACETALS

[75] Inventors: Jacob Ackermann, Gorla Minore; Pierino Radici, Turate; Pietro Erini, Olgiate Olona, all of Italy

[73] Assignee: Societa Italiana Resine S.I.R. S.p.A., Milan, Italy

[22] Filed: Dec. 27, 1972

[21] Appl. No.: 318,970

[30] Foreign Application Priority Data
Dec. 27, 1971 Italy .................................. 32947/71
Sept. 20, 1972 Italy .................................. 29424/72

[52] U.S. Cl. .............. 260/67 R, 260/64, 260/67 FP
[51] Int. Cl. ........................... C08g 1/26, C08g 3/00
[58] Field of Search .......................... 260/67 FP, 64

[56] References Cited
UNITED STATES PATENTS
| | | | |
|---|---|---|---|
| 3,393,179 | 7/1968 | Leverett | 260/67 FP |
| 3,406,151 | 10/1968 | Klinkmann et al. | 260/67 FP |
| 3,437,640 | 4/1969 | Schweitzer | 260/67 FP |
| 3,687,898 | 8/1972 | Ishii et al. | 260/67 FP |

OTHER PUBLICATIONS
Sittig, Hydrocarbon Processing & Petroleum Refiner, Vol. 41, No. 11 (Nov. 1962), pp. 131–170, cited pp. 131, 150, 451.
Sittig et al., Ibid Vol. 45, No. 11 (Nov. 1966), pp. 155–170, cited 155, 166 & 167.

*Primary Examiner*—Lucille M. Phynes
*Attorney, Agent, or Firm*—Sughrue, Rothwell, Mion, Zinn & Macpeak

[57] ABSTRACT

Process for stabilising polyacetals of a molecular weight above 10,000 containing residues of one or more aldehydes with or without residues of non-aldehydic co-monomers by reaction of the terminal hydroxyl groups of the macromolecule with a blocking reagent, in which the said reagent is brought into contact with the polyacetal suspended in a reaction medium which is liquid under the working conditions, the said reaction medium comprising at least one substance which is invert vis-a-vis the other constituents of the reaction mixture, is not solvent vis-a-vis the polymer and is liquid under the reaction conditions, and at least one substance which is solvent with respect to the polymer and the reagent and which is liquid under the reaction conditions, the said solvent and non-solvent substances being completely miscible under the conditions in which reaction takes place, but immiscible or partially miscible at temperatures substantially below the reaction temperatures.

23 Claims, No Drawings

PROCESS FOR IMPARTING STABILITY TO POLYACETALS

The present invention relates to an improved process for imparting stability to polyacetals.

More particularly, the invention relates to the conversion, by chemical reaction, of the terminal hydroxyl groups which render such polyacetals unstable.

During the course of the present description, polyacetals will be understood as being those products with a molecular weight greater than at least 10,000, which are obtained industrially by polymerising an aldehyde or by copolymerising a plurality of different aldehydes or by copolymerising one or more aldehydes with other non-aldehydic monomers. More particularly, polyacetals are understood to be:

the homopolymers of aldehydes or relative cyclic oligomers, such as formaldehyde, trioxane, tetraoxane and acetaldehyde;

the copolymers of at least two different aldehydes;

the copolymers which in the macromolecular chains, contain recurrent hydroxymethylene units having the general formula:

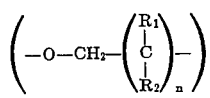

Copolymers of this type are for example those defined in Canadian Pat. No. 773.159.

Such copolymers may be obtained for example by copolymerising an aldehyde such as formaldehyde, or the relative cyclic oligomer such as trioxane, with different monomers such as:

cyclic ethers such as ethylene oxide, 1,3-dioxolane and epichlorohydrin;

unsaturated vinyl compounds such as styrene vinylmethylketone, acrolein and vinylether;

ketenes, such as dimethylketene.

It is known that such polyacetals contain for each macromolecule at least one hydroxyl group which renders the polymers themselves unstable at their working and transformation temperature. Therefore, in industry, such unstable polymers can be treated by appropriate reagent in order to convert their terminal hydroxyl groups into other groups having greater stability.

For example, it is already known that polyacetals can be stabilised thermally and chemically by esterification of the hydroxyl groups by reaction with carboxylic acid anhydrides (normally with the anhydrides of acetic, propionic and butyric acids) or with ketenes.

According to another known technique, the hydroxyl groups of the polyacetals are converted to ester groups of carbammic or thicarbammic acids by reaction with isocyanates (for example toluene-2,4-diisocyanate) or respectively with isothiocyanates.

Processes for the transesterification of such hydroxyl groups are also known.

According to another process known in the art, the hydroxyl groups of the polyacetals are subjected to etherification by reaction with alcohols (generally methanol), with orthoesters such as methylorthobenzoate, with epichlorohydrin or with acrolein. Finally, it is possible to convert such hydroxyl groups to methylether groups by reaction with diazomethane.

The stabilisation processes described are carried out in the prior art by bringing the reagent in gaseous or liquid form into contact with the polyacetal which may be solid or dissolved or suspended in a liquid phase. If a liquid phase process is chosen, this phase may be constituted by the reagent itself.

For example, in the conversion of the hydroxyl groups of polyacetals to esters of carbammic or thiocarbammic acid, the reagent is brought into contact with the polymer suspended in an inert solvent, generally in the presence of appropriate catalysts. Furthermore, in esterification by carboxylic acid anhydrides, a process which has long been employed in the prior art, the polymer is maintained dissolved in the esterification agent or the process is conducted on the polymer while it is in the solid phase.

In the last-mentioned case, it is possible to supply the gaseous acid anhydride to the solid polymer, or the polyacetal is maintained in the suspended esterification agent.

The problems which are encountered in the stabilisation processes described consist essentially in achieving the most complete transformation possible of the polyacetals, in the quickest possible way and without adversely affecting the characteristic features of the resultant products.

Obviously all this has to be carried out in the simplest and most economic manner possible. In fact, a high rate of conversion of the hydroxyl groups ensures high yields of stable polymer. Furthermore, since the reaction to block the terminal groups is accompanied by a competitive reaction tending to degrade the non-stabilised polyacetal, it is important for transformation of the hydroxyl groups to be carried out at high speed.

Moreover, it is essential not to damage the characteristics of the stablised polyacetals, coloured polymers or polymers of poor mechanical properties being useless or in any event less desirable in the industry.

Finally, the simplicity and economy of the treatment are important; for example, it is desirable to avoid a high ratio of reagent to polymer, in order to avoid the substantial cost of thermal energy and the inevitable losses, particularly during the phases of recovery and purification necessary for recycling. In stabilisation processes involving use of the polyacetal in the solid phase, the problems are above all those which are encountered in chemical reactions involving a solid and crystalline substance.

Thus, in the case of polyacetals, a considerable part of the terminal groups of the macromolecules are not readily accessible to the reagent, as described by Diebin, et al., in "Die Makromolekulare Chemie," 99 (1966), pp. 9–26, so that it is very difficult to achieve a satisfactorily high fraction of polymer is stable form.

Such a procedure also has other disadvantages. For example, when the acid anhydride is supplied in the form of vapour to the solid polymer, serious technological problems are encountered which derive essentially from the bringing of a gas into contact with a solid which is sticky or which does not flow readily, and from the exchange of heat in such an arrangement.

In processes in which the solid polyacetal is brought into contact with an esterification reagent, attempts have been made to increase the velocity of reaction by using catalysts of the alkali metal acetate, amine and other types.

It is however known that such catalysts not only favour the formation of colured products but also give rise to various drawbacks in the subsequent processing of the stabilised polymers, so that their elimination from the polymers themselves is desirable.

Serious problems of purification arise in those processes in which the esterification agent is supplied to the solid polyacetal in gaseous form.

In such processes, it is in fact virtually impossible to eliminate the esterification catalyst and the harmful by-products of the reaction, save by repeated washings of the polymer, which makes the actual process economically intolerable.

Such by-products also form when one is working in the absence of catalysts and result in polymers which may be coloured or have poor resistance to heat and oxidation.

Furthermore, working in the manner described results in the formation of substantial quantities of other by-products even though they may not be harmful to the polymer, such as methylene glycol diester by reaction of the formaldehyde produced during degradation of the polymer, with carboxylic acid anhydride, which results in considerable losses of reagent.

Various problems which have remained unsolved or which are difficult to resolve in processes involving the solid polyacetal have been overcome by working with the polymer in dissolved form, such as for example when the hydroxyl groups are esterified, the polyacetal being kept dissolved in the carboxylic acid anhydride or some other suitable solvent.

By an appropriate choice of the conditions of reaction, it is possible by such a process to achieve a high rate of conversion of the hydroxyl group into ester groups with a low decomposition of the polyacetal.

Furthermore, the polymer which is thus stablised is normally white and has a minimal content of harmful by-products which remain largely dissolved in the solvent used.

However, even this procedure has various disadvantages, above all since it is possible to work with dissolved polymer only by using large quantities of solvent, or reagent in the case of the reagent being used as a solvent.

In other words, it is possible to work only with high ratios of reagent or solvent to polymer, since if the proportions are kept small, the solutions obtained are so viscous that they virtully prevent heat exchange and flow in the apparatus.

In fact, we find that a polymer of formaldehyde with a molecular weight equal to at least 60,000, dissolved in acetic acid anhydride, with a weight ratio of acetic anhydride to polymer equal to 10:1 forms a solution with a viscosity equal to approximately 50 cps. The viscosity rises to approximately 1,000 cps when the ratio is equal to 5:1.

Now, the first value for viscosity is quite acceptable for carrying out the reaction to esterify the hydroxyl groups of the polyacetal, while the second figure is such as to render the reaction virtually unfeasible.

Furthermore, in processes involving a dissolved polyacetal, there are problems concerned with the precipitation of the stabilised polymer.

In fact, it is possible to obtain a precipitated polymer having undesirable characteristics, such as for example a sticky polymer or one which in any event has properties which render the subsequent filtration stage very difficult.

Furthermore, the apparent density of the precipitated polymer is generally so low as to create substantial problems in the subsequent handling and storage phases. Finally, the large quantities of solvent or reagent used make the process hardly economic due to the considerable cost of heat energy, considerable cost of reagent or solvent used, the substantial losses in the purification and recovery stages needed for recycling and the very large heat exchange areas involved.

For all the reason described, a need was felt for improving processes in which polyacetals are treated to transform the unstable hydroxyl groups in the macromolecule to other groups of greater stability.

Therefore, an object of the present invention is a process which allows virtually complete blocking of the terminal hydroxyl groups of the macromolecules of polyacetals in a short period of time.

Another object of the present invention is a process for blocking the hydroxyl groups of polyacetals and which calls for low molar ratios of reagent or solvent to polyacetal.

A further object of the present invention is a process for blocking the hydroxyl groups of polyacetals and which requires a very low consumption of reagent or solvent.

Another object of the present invention is a simple and economically suitable process for blocking hydroxyl groups of polyacetals and for recovering the thus stabilised polymers from the reaction medium.

Another object of the present invention is a process for blocking the hydroxyl groups of polyacetals, which makes it possible to obtain stabilised polymers having improved characteristic properties, the yield of the process being high.

Further objects of the invention will become apparent from the following description.

The process of the present invention is particularly applicable to the esterification of terminal hydroxyl groups of polyacetals by means of carboxylic acid anhydrides, to the transformation of such hydroxyl groups to ester groups of carbammic or thiocarbammic acid and to transformation into ether groups.

Therefore, the process will mainly be described in relation to such transformation processes, although there is no intention to confine it to such processes, in that the teachings described may be applied also to other reactions to block the hydroxyl groups of polyacetals, which have been previously described. According to the process of the present invention, the reagent suitable for blocking the unstable hydroxyl groups of polyacetals is brought into contact with the polyacetal suspended in a reaction medium which is liquid under the working conditions, the said reaction medium consisting of measured quantities of at least one substance which is solvent with respect to the polymer and at least one inert substance which is not solvent with respect to the polymer itself, the said solvent and non-solvent substances being completely miscible at the reaction temperatures but immiscible or partially miscible at temperatures substantially below the reaction temperatures.

Therefore, in the ensuing description, the term reagent denotes a substance capable of reacting with the terminal hydroxyl groups of the macromolecules of polyacetals. Furthermore, solvent substance is understood as being a substance which is liquid in the working conditions and which is a solvent with respect to the polyacetal under the temperature conditions in which blocking of the hydroxyl groups of the polymer is implemented. The said solvent substance contains the reagent in dissolved form or may be constituted by the actual reagent. The term non-solvent substance is understood to be a substance which is liquid under the conditions of operation, in which the polyacetal is insoluble or substantially insoluble under the conditions in which the hydroxyl groups are blocked, the non-solvent substance being furthermore inert (non-reactive) with respect to the solvent substance, the reagent and the polymer.

It should be noted that when it is stated that the polyacetal is insoluble or substantially insoluble in the non-solvent substance, it is understood that the appearance of the polymer non-solvent substance mixture is heterogeneous and that in the filtration of such a mixture by a filtering means with a pore diameter equal to or less than that of the particles of polymer, it is possible to obtain virtually complete separation of the polymer from the non-solvent substance.

According to a fundamental preferred feature of the present invention, the solvent substance and the non-solvent substance are completely miscible in the range of temperature in which blocking of the hydroxyl groups of the polyacetals takes place, whereas they are immiscible or not readily miscible at temperatures below those of reaction, such as for example at ambient temperature (20°–25°C).

According to the process of the present invention, the reaction to block the hydroxyl groups of the polyacetals is carried out at a temperature equal to or greater than that at which the polyacetal dissolves in the solution consisting of the solvent substance and the reaction (reaction in the absence of a non-solvent substance) or in the reagent when this latter also functions as a solvent (still in the absence of the non-solvent substance), when the weight ratio of the said solution to the said reagent and the polymer is greater than 5, up to a maximum value equal to the melting temperature of the polyacetal. Furthermore, in the reaction medium, a ratio of solvent to non-solvent substances in maintained such that the polyacetal remains undissolved under the temperature conditions at which blocking of the hydroxyl group takes place.

The reagent preferred according to the process of the present invention consists of the carboxylic acid anhydride or the isocyanate or isothiocyanates, or the ortho-esters.

Normally used among the carboxylic acid anhydrides are those of acetic, propionic and butyric acids.

In addition, the isocyanates are normally chosen from the types of compound consisting of phenylisocyanate and p-toluencisocyanate, whereas particularly useful among the isothiocyanates are phenylisothiocyanate, alphanaphthylisothiocyanate and para-toluencisothiocyanate.

Another group of isothiocyanates useful for the purposes of the present invention are those having the following general formula:

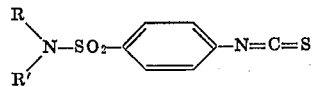

in which R is an alkyl, aryl, cycloalkyl or cycloaryl group and R' is hydrogen or an alkyl, aryl, cycloalkyl or cycloaryl group.

Of this last-mentioned group of compounds, N,N'dimethylsulphamide-p-phenylisothicoyanate is particularly preferred.

According to one form of embodiment of the process of the present invention, the polymer solvent consists of the reagent which is used for blocking the unstable hydroxyl groups of the polyacetal. In this case, the solvent substance is preferably chosen from the group of compounds previously described with respect to the reagents. It is however possible also to work with solvents other than the reagent and in this case, the compounds following belonging to the following general classes will generally be used: substituted amides such as dimethylformamide or dimethylacetamide; aromatic nitroderivatives such as nitrobenzene; lactones such as gammabutyrolactone; ketones such as methylisobutyl ketone; esters such as butyl acetate, isobutyl acetate and methylene glycol diacetate and sulphoxides such as dimethylsulphoxide.

Among the substances which are not solvent to the polyacetal, particularly useful for the purposes of the present invention are the saturated aliphatic carbons which have a branch or linear hydrocarbon chain, the cyclo-aliphatic hydrocarbons and the alkyl aromatic carbons in which the alkyl chain (linear or branch) contains at least 6 carbon atoms.

Particularly preferred among these are the linear paraffins having from 6 to 20 carbon atoms per molecule and the alkylbenzenes having from 8 to 20 carbon atoms in the linear or branch alkyl chain. We would mention that the choice of substance which is not solvent to the polymer depends upon the type of solvent shown, as well as on the reaction temperature and on the particular polymer which is to be stabilised. In any case, a man skilled in the art will be able readily to find for given reaction conditions those non-solvent substances which satisfy the requirements previously stated.

By working according to the process of the present invention the best results are obtained when blocking of the unstable hydroxyl groups of the polyacetal is carried out at temperatures within the range of 130° to 185°C, the weight ratio of solvent to non-solvent being maintained at approximately 0.05:1 to 1:1.

Under these conditions, it is possible to maintain in the reaction ambient a weight ratio of polyacetal to the total of solvent and non-solvent substances which may be as high as 1:0.5, although it is possible to work at lower values such as for example up to 1:10 by weight.

Finally, it is possible but normally unnecessary to achieve blocking of the hydroxyl groups of the polyacetals in the presence of accelerators such as for example amines, amides and alkali metal salts of carboxylic acids, or in the presence of stabilizers and additives which are well-known in the art, such as for example those described in Italian Pat. No. 719.817.

Working according to the process of the present invention, it is possible above all to achieve a virtually complete reaction of the hydroxyl groups of the polyacetals with a high yield of stabilised polymer, the times required for such reaction being relatively short and generally comprised between 1 to 60 minutes.

The fact of obtaining a virtually total reaction (99.9 to 100 percent) of the hydroxyl groups of the polyacetals by working according to the process of the present invention is an important result in that, as appears in the aforementioned article by Diebig, it was not possible in the prior art to obtain a rate of conversion of such hydroxyl groups in excess of 95 percent when working with the polyacetal in a suspended form.

Furthermore, it is possible to work with high ratios by weight of polymer to reagent or of polymer to the total of reagent and polymer solvent, the consumption of reagent being very low and in any event close to the theoretical values.

Furthermore, the process of the present invention takes on an altogether very simple and economical aspect and permits of easy recovery of the stabilised polymer.

The reasons why such unexpectedly improved results are obtained when stabilising polyacetals according to the process of the present invention are not completely clear. Without wishing to confine ourselves to any particular theory, it is felt that the joint use of the solvent and substances which are not solvent with respect to the polyacetal, under the particular conditions described, permits of selective dissolution of that part of the polyacetal macromolecule to which are linked the unstable hydroxyl groups which are subjected to the blocking reaction.

The remaining part of the macromolecule which constitutes the greater fraction and which comprises the crystalline part of the macromolecule itself, remains on the other hand in a non-dissolved form due to the presence of the non-solvent substance.

This selective dissolution is probably the reason for the rapid and complete blocking reaction of the hydroxyl groups, while the fact of having the greater part of the macromolecule in undissolved form permits on the one hand avoidance of the drawbacks relative to complete dissolution of the polyacetal and on the other avoidance of the drawbacks which relate to separation of the stabilised polymer from the relative solution.

Furthermore, the fact of working in a liquid medium makes it possible to remove from the polymer any catalyst which has been used, together with the other products which form during the stabilising reaction, since all these undesired products remain dissolved in the liquid reaction medium.

Furthermore, the immiscibility of the solvent and non-solvent substances at temperatures below the reaction temperature affords further advantages.

For example, at the end of reaction to block the unstable hydroxyl groups and after separation of the stabilised polymer (for example by filtration), the solvent substance is separated from the non-solvent substance by simply cooling the mixture.

Experimentally, it has been observed that following such cooling, a phase is obtained which consists of the solvent substance containing almost all the impurities and by-products which form during the stabilising reaction.

In this way, only the solvent substance is subjected to purification prior to recycling, the non-solvent substance being recycled as it is without any preventive treatment and only after a mild processing.

This is undoubtedly advantageous, having regard also to the fact that, in the reaction medium, the non-solvent substance generally predominates over the solvent substance.

By means of the present invention, polyacetals are stabilised by a process which embodies the advantages inherent in those processes of the prior art in which the polyacetal is in dissolved form and in those in which the polymer is used in a solid form, while at the same time the disadvantages of such prior processes are avoided.

For example, in known processes in which a dissolved polymer is used, it is necessary to maintain in the reaction medium ratios by weight of reagent plus solvent to polymer equal to 8:1 or more.

In the process according to the present invention, it is typical to work with a weight ratio of solvent to non-solvent substance equal to approximately 0.1:1 while the ratio by weight of solvent and non-solvent to polymer is equal to 2:1.

In this way, the liquid reaction medium which has been subjected to purification prior to recycling is equal to 8 parts by weight to every part by weight of polymer in the case of the aforesaid prior art process, this value being equal to 0.2 in the process of the present invention.

Finally, it is essential in the process of the present invention that the solvent and non-solvent substances be immiscible or not readily miscible at temperatures below the polyacetal stabilising temperatures.

It has in fact been noted experimentally that when using mixtures of solvent and non-solvent substances which are miscible at low temperatures, for example at ambient temperature, the reaction of blocking the hydroxyl groups of the polyacetal is less complete and therefore a polyacetal is obtained which is not satisfactorily stabilised.

The reasons for such behavior are not completely known but it is however felt that when working according to the process of the present invention, it is possible to achieve a higher concentration of reaction in the polyacetal.

In other words, the non-solvent substance in the present process would seem to have the effect of increasing the distribution coefficient $C = Cp/Cm$, defined as the ratio of the concentration of the reagent in the polymer to the concentration of the same reagent in the reaction medium.

The above is a general discussion of the invention.

The invention is however particularly applicable to the conversion of the unstable hydroxyl groups of polyacetals into ether groups.

The discussion already given largely applies to this etherification aspect of the invention also.

There are valid reasons for preferring to have the hydroxyl groups of the polyacetals present in etherified form, although at present the esterification technique is the one most used in practice.

In fact, following the etherification treatment and subsequent elimination of any non-stabilised polymer, products are obtained which are stable under alkaline action. The chemical stability to alkaline hydrolytic action is greater for the ether group than for the ester group.

Furthermore, the terminal ether group is more thermally as well as chemically stable with respect to the ester group.

In consequence, etherified polyacetals require additives for further thermal and oxidative stabilisation (addition of phenol compounds and basic organic compounds containing nitrogen) by means of less sophisticated systems.

The introduction of simple groups such as methyl and ethyl at the end of the macromolecules represents an element of minor disturbance in the crystalline structure compared with the simplest ester (acetyl) group.

This makes for greater compactness in the structure with a consequent improvement in general properties such as physico-mechanical and electrical properties, etc.

Etherified polyacetals therefore have high mechanical properties and also considerable chemical resistance so that such polymers are suitable for special applications.

Notwithstanding these high characteristics, the technique of polyacetal etherification is not in practice exploited due to the difficulties entailed by such a procedure.

In this respect, we would mention that the reaction of etherification by orthoesters is conducted, according to known processes, by the solution technique, or in any event in some medium which is potentially solvent even when the working temperatures fall within a range in which such dissolution is not complete.

This fact comprises two types of reaction, in other words a reaction to block the terminal groups and a transacetalisation reaction, the latter taking place to a greater extent on the dissolved polymer fraction and to a lesser degree on the fraction which is suspended in the reaction medium.

The greatest disadvantages which are encountered by etherifying polyacetals according to the prior art techniques are various.

First of all, the reaction is carried out with catalysts of the cationic type and then it may be carried out either on the terminal groups or above all on the macromolecular chain with a consequent reduction in molecular weight (transacetalisation reaction). This undesired phenomenon is enhanced by the fact of having to proceed in solution in order to achieve higher reaction velocities; indeed, when working in solution, the entire polymer chain is exposed to acid attack from the catalyst. Furthermore, in order to bring about dissolution of the polymer and to avoid a high viscosity in the reaction medium, it is necessary to work with high ratios of reagent or solvent and reagent to the polyacetal which is being subjected to treatment.

The use of large quantities of reagent is undesirable due to the high cost of such reagent and also due to the need for it to be purified and recycled. Furthermore, a high viscosity in the reaction medium involves difficulties in heat exchange and in handling in general.

When one is working with a completely or partially dissolved polyacetal, there is the problem of recrystallisation of the polymer itself in a physical form suitable for the subsequent transformation stages (purification, washing and drying).

Currently known processes for the preparation of crude (non-stabilised) polyacetals generally make it possible to obtain powdered products of high apparent density.

When such polymers are stabilised by the technique involving partial or total dissolution, a lessening of such apparent density is obtained at the end of the treatment.

Furthermore, when stabilisation is carried out in a context of conditions in which there is no dissolution (when the medium is completely non-solvent) of the polyacetal, there are normally low reaction velocities and low yields of stabilised polymer.

The reaction to etherify polyacetals may be carried out with other substances having transacetalising properties such as epoxides, acetals and cyclic ethers.

In these cases, too, the reaction is carried out at low temperatures resulting in low velocities of reaction, low yields of stabilised polymer and considerable reductions in molecular weight.

In order to limit such negative results, the need was felt to use polyacetals having high values of crystallinity.

But not even in this case were particularly interesting results achieved.

In the following description, the term reagent implies a substance capable of converting to ether groups the unstable hydroxyl groups of the polyacetals.

More particularly, the term reagents is used to describe substances belonging to the following classes: methyl or ethyl orthoesters, such as orthoformate, orthoacetate and orthocarbonate; epoxides such as ethylene oxide and propylene oxide; acyclic ethers such as dimethyl ether; cyclic ethers such as tetrahydrofuran; acetals such as methylal, 1,1-diethoxyethane, 1,2-glycerylformal, tetramethylglyoxyacetal.

Solvents useful for the purpose belong to the following general classes: substituted amides such as dimethylformamide and dimethylacetamide, aromatic nitro derivatives such as nitrobenzene, sulphoxides such as dimethylsulphoxide and nitriles.

The non-solvents preferred are those already discussed, including the $C_6 - C_{20}$ linear paraffins and $C_8 - C_{20}$ alkyl benzenes.

As discussed generally earlier, the reaction to etherify the hydroxyl groups of the polyacetals preferably takes place in a range of temperatures, the upper limit of which is constituted by the melting point of the polyacetal, while the lower limit corresponds to the temperature at which immiscibility between the solvent substance and non-solvent substance becomes manifest.

The best results are normally obtained at temperatures within the range of 130° to 185°C, when in the reaction medium, a ratio by weight of solvent to non-solvent of between 0.05:1 and approximately 1:1 is maintained. Finally, the ratio of polymer to solvent and non-solvent is not critical, but it is a particular feature of the process of the present invention that it is possible to work with very high values of this ratio, generally up to values equal to 1:0.5.

It is however possible to work at lower values of the said ratio, such as for example 1:10.

The etherification reaction is carried out in the presence of catalysts consisting of acids of the Lewis type which give rise to cationic type catalysis.

Examples of catalysts which are useful for the purposes of the present process are boron trifluoride and complexes of boron trifluoride such as boron trifluoride etherate.

Other catalysts which may be used consist of complex salts of fluoroboric acid such as p-nitrobenzenediazofluoborate and phenyldimethoxycarboniofluoborate.

Working with such catalysts and under the conditions described, it is possible to achieve virtually complete etherification of the polyacetal in a relatively short time, generally between 1 and 60 minutes.

The discussion of reasons and theory of the attainment of improved results, already given above, applies also to the present aspect of the invention, right through to the advantages of purification of the solvent substance before recycling and the recycling of the non-solvent substance as it is.

In particular the fact of having the greater part of the macromolecule in undissolved form greatly reduces acid attack from the catalyst on the polymer chain, with the result of minimising the phenomena of diminution of molecular weight, so that higher reaction yields are possible.

Examples 1 – 7 now follow, relating to the first-discussed and general aspect of the invention without in any way limiting its scope.

In particular, in Examples 1 to 6, an apparatus is used which consists of a 5-litre steel reactor fitted with an agitator of the armature type, a thermometer pocket, a cooling device with arrangements for working under a controlled nitrogen pressure.

The reactor is also provided with a jacket for circulation of oil linked to a thermostat. A tube connected to the bottom of the reactor makes it possible to transfer the reaction mixture directly onto a steel filter with a diameter equal to 30 cm.

The filtering sector comprises a particular steel mesh. The filter is fitted with a steel disc which makes it possible to compress the moist filtered polymer. The liquid filtrate is connected in a glass vessel of 5-litres capacity.

EXAMPLE 1 (comparison)

The apparatus described in the text above is supplied with nitrogen and then 1,800 g of pure acetic anhydride and 150 g of the polyacetal polyoxymethylene glycol are introduced into the reactor, under agitation. The polyoxymethylene glycol is obtained by polymerising pure formaldehyde monomer in an inert liquid medium (standard heptane), using an anionic type polymerisation initiator. In addition, the polymer has a high molecular weight, the inherent viscosity being equal to 2.21, measured in p-chlorophenol at 60°C.

The reactor is heated, the oil temperature rising to 180°C.

The temperature inside the reactor is stabilised at around 155°C. At this temperature, the polymer is dissolved in the reagent in the form of a viscous solution. This solution is maintained under the conditions described for 20 minutes and after this period, cooling commences.

This causes precipitation of the polymer which gives rise to a dense suspension which it is difficult to stir.

By virtue of its thickness, the suspension is then transferred slowly over the steel filter and the polymer is forced out by the device previously described.

The reagent recovered in the collection vessel in quantities equal to 1,300 g is of a brownish colour.

The polymer, in the form of a very fine powder, is repeatedly washed over the filter by means of acetone. The wet powder is then dried in an oven at 60°C and at a pressure below atmospheric pressure. In this way, 136.5 g of esterified polymer are obtained, having an inherent viscosity which is virtually unchanged with respect to the non-stabilised polymer.

The apparent density of the powder is then determined.

To the powdered polymer are added pentaerythryl-tetra-beta(4-hydroxy-3',5'-diterbutylphenol) propionate (0.3 percent by weight) and the product obtained by copolymerising caprolactam and caprolactone in a molar ratio of 95:5 (0.5 percent by weight).

The mixture is melted and extruded by means of a screw-type extruder (of the Brahender type), laboratory model, working at a temperature of 190°–220°C and is then converted to granules measuring 2 × 2 mm, by means of an automatic guillotine. The following tests are then carried out on the granulate (POM 1):

thermal degradation at 220°C in a nitrogen atmosphere ($K_{220}$): rate of decomposition at a percentage by weight of polymer per minute during the first 30 minutes;

thermal degradation in air at 220°C ($D_{220}$): loss as a percentage by weight of polymer after 10 and 20 minutes.

The results of the test are shown in Table 1.

EXAMPLE 2 (comparison)

Into the previously described reactor are placed 1,440 g of toluene, 360 g pure acetic anhydride and 150 g of polyoxymethylene glycol. The acetic anhydride and the polymer are identical to those described in the first example.

Heating of the reactor is started by circulation of hot oil at 180°C, raising the interior temperature to around 155°C. The reaction mixture is maintained at this temperature for 20 minutes.

After this period, cooling commences. The suspension of precipitated polymer which is obtained in this way is very dense and agitation is difficult and not very effective for some time. The suspension is then, and with difficulty, transferred onto a steel filter and the polymer is expressed. The homogeneous liquid recovered in the collecting vessel (1,280 g) has a yellowish colouring when cold.

The damp powdered polymer is then washed with acetone and dried in an oven at 60°C at below ambient pressure.

In this way, 125.5 g of polymer are recovered on which the apparent density and inherent viscosity are determined.

The value for this last-mentioned property is virtually equal to that of the polymer prior to stabilisation. To the powdered polymer are then added the stabilising agents described in the first example, in the same quantities, and the mixture is converted to granules. The granular polymer (POM 2) thus obtained is subjected to the tests described in the first example and the results are listed in Table 1.

EXAMPLE 3 (comparison)

1,440 g pure acetic anhydride, 360 g amyl acetate and 150 g polyoxymethylene glycol are placed in the reactor previously described. The acetic anhydride and the polymer are identical to those described in Example 1.

Heating of the reactor by circulation of oil thermostatically controlled at 185°C is commenced and the pressure in the system is increased, the internal temperature being raised to 155°C.

The viscous solution of polymer is left at that temperature for 20 minutes and after the said period, cooling is commenced. The polymer precipitates, giving rise to a very dense suspension which is difficult to stir. By virtue of its thickness, the suspension is therefore slowly transferred onto the steel filter and the polymer is squeezed out.

The homogeneous liquid (1,300 g) in the vessel in which the filtrate is collected has a yellow colouring.

The moist powder is then washed with acetone and dried in a vacuum oven at 60°C.

In this way, 127.5 g of polymer are recovered in the form of a fine powder, the apparent density and inherent viscosity of which are determined. The inherent viscosity is virtually equal to that of the unstabilised polymer. The stabilisers are added to the powdered polymer and the mixture is then granulated as described in Example 1.

The granular polymer (POM 3) is subjected to the tests described in Example 1 and the results are listed in Table 1.

EXAMPLE 4

360 g pure acetic anhydride, 1,440 g of a mixture of linear paraffins having from 10 to 15 carbon atoms per molecule and 360 g of polyoxymethylene glycol are placed in the reactor previously described.

The linear paraffins have the following composition as percentages by weight: $C_{10} = 10\%$, $C_{11} = 12\%$, $C_{12} = 30\%$, $C_{13} = 14\%$, $C_{14} = 25\%$, $C_{15} = 9\%$, in addition to which the acetic anhydride and the polymer are those described in the first example.

Heating is then started by circulation of oil which is thermostatically controlled at 180°C and the internal temperature is brought to around 155°C.

The very fluid suspension which is thus obtained is maintained for 20 minutes at the said temperature values, after which cooling commences.

The suspension is then transferred rapidly to the steel filter, where it is easily filtered. The liquid filtrate (1,490 g) recovered in the collecting vessel separates at ambient temperature in two layers: an upper paraffin layer and a lower layer consisting of the acetic anhydride.

The paraffin layer contains 2.06 percent by weight of acetic anhydride.

The granular polymer left on the filter is washed with acetone and then dried in an oven at 60°C at below atmospheric pressure.

In this way, 335 g of powdered polymer are recovered, and the apparent density and inherent viscosity are determined. The value for the latter property is virtually equal to that of the unstabilised polymer.

The polymer is then subjected to tests to determine the hydroxyl groups reacted according to the method described by Diebig and others in "Die Makromolekulare Chemie," 99 (1966) pp. 9–26.

Thus it is found that virtually 100 percent of the hydroxyl groups of the polyacetal were blocked. The stabilisers are then added to the polymer which is converted to granules as in the first example. The granular polymer (POM 4) is then subjected to the tests described in the first example and the results are listed in Table 1.

EXAMPLE 5

600 g pure acetic anhydride, 1,200 g cyclohexane and 600 g of polyoxymethylene glycol are placed in the reactor previously described. The acetic anhydride and the polymer are those described in Example 1.

Heating of the reactor by circulation of oil commences, the internal temperature being raised to around 155°C.

The suspension is maintained at that temperature for 20 minutes, after which cooling commences. The suspension is rapidly transferred to the steel filter and the polymer is squeezed out.

The liquid recovered (1,200 g) in the collecting vessel, at ambient temperature, forms two colourless phases: an upper cycloparaffin phase and a lower phase consisting essentially of acetic anhydride. The upper stratum contains 4.4 percent by weight of acetic anhydride.

The polymer powder is washed easily on the filter by acetone and then dried in an oven at 60°C and at below atmospheric pressure. 546 g of polymer are recovered, the apparent density and inherent viscosity of which are then determined.

The value of the latter is virtually equal to that of the unstabilised polymer. The quantity of hydroxyl groups reacted is virtually also equal to 100 percent, determined as described in Example 4.

The stabilisers are then added to the powdered polymer which is granulated as described in the first example.

The granular polymer (POM 5) is subjected to the tests described in the first example and the results are listed in Table 1.

EXAMPLE 6

120 g pure acetic anhydride, 480 g methylene glycol acetate 1,200 g n-octane and 150 g polyoxmethylene glycol are placed in the reactor previously described. The acetic anhydride and the polymer are those described in Example 1.

Heating of the reactor by the circulation of oil commences, the internal temperature being raised to around 155°C.

The suspension is maintained at that temperature for 20 minutes after which cooling commences. The suspension is rapidly transferred onto the steel filter and the filtered polymer is expressed.

The liquid recovered (1,180 g) in the collecting vessel forms at ambient temperature two colourless strata: an upper paraffin stratum and a lower stratum consisting of methylene glycol diacetate and acetic anhydride. The powdered polymer left on the filter is easily washed with acetone and then dried in an oven at 60°C and below atmospheric pressure. 562 g of polymer are recovered, the apparent density and inherent viscosity of which are then determined. The value of the latter property is virtually equal to that of the unstable polymer. Furthermore, the quantity of reacted hydroxyl groups is virtually equal to 100 percent, determined as described in Example 4.

The stabilisers are then added to the polymer and granulation is carried out as in Example 1. The granular polymer (POM 6) is subjected to the tests described in the first example and the results listed in Table 1.

Table 1

| Polymer | D. | C. | A. | $K_{220}$ | $D_{220}$ 10' | 20' |
|---|---|---|---|---|---|---|
| POM 1 | 0.18 | b.-g. | c. | 0.03 | 0.8 | 1. |
| POM 2 | 0.17 | b.-g. | sb. | 0.18 | 4.0 | 10. |
| POM 3 | 0.20 | g. | c. | 0.04 | 0.9 | 1.7 |
| POM 4 | 0.41 | b. | c. | 0.03 | 0.7 | 1.4 |
| POM 5 | 0.43 | b. | c. | 0.03 | 0.9 | 1.5 |
| POM 6 | 0.39 | b. | c. | 0.04 | 0.8 | 1.2 |

Key to table:
D. = apparent density of powder
C. = colour of granulate
A. = appearance of granulate
b.-g. = yellowish white
g. = yellowish
b. = white
c. = compact
sb. = loose

EXAMPLE 7

A mixture comprising 1 part by weight polyoxymethylene glycol, 0.3 parts by weight pure acetic anhydride and 1.7 parts by weight of a mixture of linear paraffins is placed in a horizontal screw-type steel reactor. The said linear paraffins have the following composition: $C_{14} = 10\%$, $C_{15} = 30\%$, $C_{16} = 35\%$, $C_{17} = 19\%$, $C_{18} = 6\%$ (by weight). The polyoxymethylene glycol has an inherent viscosity equal to 1.84 measured at 60°C in parachlorophenol containing 2 percent alpha-pinene.

The reactor has a jacket for heating by circulation of oil and a device suitable for regulating the internal temperature through the pressure.

The temperature of the oil is maintained at around 190°C while the contents of the reactor are maintained in a nitrogen atmosphere. The rate of supply and the regulation of the moving parts are controlled so as to ensure that the mixture stays in the reactor for an average dwell time of 10–12 minutes. In consequence, the average throughput is equal to 60 kg/hour of polymer.

The mixture is discharged continously into an intermediate container and then supplied at intervals to a centrifuge, by means of a screw conveyor.

The polymer is washed with toluene and dried, obtaining an output of acetylated product equal to 57.1 kg/hour.

From the liquid collected, containing the toluene, the acetic anhydride and the paraffins are almost completely recovered.

The acetylated polymer powder (POM 7B) is subjected to the thermal degradation test in nitrogen as described in the first example. The original polyoxymethylene glycol (POM 7A) is subjected to the same test.

Furthermore, the stabilisers described in the first example are added to the powdered polyacetal in the same quantity, after which the mixture is converted to granules.

The polymer which is thus granulated (POM 7C) is subjected to the tests described in the first example. The results are summarised in Table 2.

Table 2

| Polymer | $K_{220}$ | $D_{220}$ | |
|---|---|---|---|
| | | 10 mins. | 20 mins. |
| POM 7A | 1.5 | — | — |
| POM 7B | 0.09 | — | — |
| POM 7C | 0.02 | 0.9 | 1.2 |

The following experimental Examples 8 to 15 illustrate the etherification aspect of the invention as discussed earlier, without limiting it in any way.

In the said experimental examples, determination of the stable alkaline fraction of the etherified polymer is based on the principle which foresees attack of the fraction of the polymer which is not etherified in solution, at high temperature and in the presence of an alkaline agent.

Under these conditions, the hydroxy methylene macromolecules which terminate in an alcoholic hydroxyl group (—CH$_2$OH), or finishing with an ester group (for example formate or acetate) undergo hydrolysis until complete elimination occurs.

More particularly, the etherified polyacetal is dissolved in benzyl alcohol containing 1 percent by weight of triethanolamine, at 150°C, a ratio by weight of benzyl alcohol/polymer of 10:1 being maintained.

The treatment time is 30 minutes while the medium is maintained under conditions which are completely inert (absence of oxygen and humidity).

At the end of the treatment, precipitation is caused by cooling and the precipitated polymer is filtered over a porous sieve and washed with methanol at 65°C to restore the polymer itself to suspension.

In this treatment, a ratio by weight of methanol to polymer equal to 8:1 is used.

The new suspension is cooled and filtered. The separated polymer is washed with methanol and finally dried under vacuum in an oven at 70° to 80°C until a constant weight is achieved.

The weighed polymer represents the "stable alkaline fraction" (FAS).

The apparatus used in Examples 8 to 15 is the same as in Examples 1 to 6.

EXAMPLE 8 (comparison)

After treating the previously-described apparatus with nitrogen, 1,620 g of pure and anhydrous N,N'-dimethylformamide, 180 g of triethyl orthoformate, 3.24 g of phenyldimethoxycarboniofluoroborate and finally 150 g of polyacetal (polyoxymethylene glycol) are introduced into the apparatus, under agitation. The said polymer is obtained by polymerisation of pure monomeric formaldehyde in an inert medium (heptane), an anionic type initiator being used.

The polymer also has an inherent viscosity of 2.50, the said viscosity being measured at 60°C in solution at the rate one half percent (weight/volume) in parachloro-phenol, to which 2 percent alphapinene is added.

Heating of the reactor is commenced by circulation of fluid at 168°C and the pressure of the system is raised so that the internal temperature is equal to approximately 155°C.

At this temperature, the polymer is dissolved and the solution is considerably viscous.

The conditions described are maintained for 30 minutes.

After this period has elapsed, the pressure is reduced and cooling commences. The polymer precipitates, giving rise to a dense suspension which it is difficult to stir.

The suspension is then transferred to the steel filter and the polymer remaining is squeezed out with the device described.

1,350 g of liquid are recovered in the collecting vessel.

The very fine polymer remaining on the filter is washed thoroughly with toluene containing one percent by weight of triethyl amine and then with toluene alone. The moist powder is finally dried in a vacuum oven at 60°C, so that 120.75 g of product (POM 1) are recovered, on which the following tests are conducted:

a. inherent viscosity: $\eta$ in
b. apparent density: $\alpha$
c. thermal degradation at 220°C in a nitrogen atmosphere: ($K_{220}$)

in other words, the rate of decomposition as a percentage by weight of the polymer per minute during the first 30 minutes.

d. stable alkaline fraction: (FAS)

A sample of polymer is brought into solution in benzyl alcohol containing 1 percent by weight of triethanolamine, at a temperature of 150° to 153°C and these conditions are maintained for 30 minutes. The ratio of polymer to benzyl alcohol is equal to 1:10. After precipitation of the polymer by cooling, the suspension is poured out at a temperature of 50°C into methanol and then filtered.

Subsequently, the product recovered is kept in suspension with methanol at boiling point for 1 hour.

The suspension is finally filtered and the polymer washed with methanol thoroughly and then dried in a vacuum oven at 60°C.

The percentage of polymer remaining is indicated as the stable alkaline fraction (FAS) and the following tests are carried out on this fraction:

e. inherent viscosity: $\eta_{in}$ (FAS)
f. thermal degredation at 220°C in a nitrogen atmosphere: $K_{220}$ (FAS)

The results of the tests are shown in Table 3.

EXAMPLE 9 (comparison)

1,440 g of N,N'-dimethylformamide, 180 g triethylorthoformate, 2,916 g of phenyldimethoxycarboniofluoborate and 450 g polyacetal are placed in the reactor using the procedure previously described. All the components of the reagent system are identical to those described in the first example. Heating of the reactor by means of circulation of fluid thermostatically controlled at 165°C is commenced and pressure is maintained in the system so that the inside temperature is around 155°C.

At this temperature, the polymer solution is very viscous, almost like a syrup and heat exchange is difficult.

These conditions are maintained for 30 minutes after which cooling is commenced.

The polymer precipitates giving rise to a suspension which cannot be stirred. With great difficulty, the suspension is transferred onto the steel filter, the mother liquid being used several times. The polymer remaining on the filter is washed thoroughly with toluene containing 1 percent triethylamine and subsequently with toluene only.

The damp powder is dried in a vacuum oven at 60°C, 310.8 g of product being recovered. The tests described in Example 8 are carried out on the polymer (POM 2). The results are shown in Table 3.

EXAMPLE 10 (comparison)

1,440 g of a mixture of linear paraffins $C_{10}$, $C_{11}$, $C_{12}$, $C_{13}$, $C_{14}$ and $C_{15}$ containing the various terms respectively in the following percentages by weight: 10, 12, 30, 14, 25 and 9 percent, 2,916 g of phenyldimethoxycarboniofluoborate, 180 g triethylorthoformate and 450 g of polyacetal are placed in the reactor, using the method previously described. The following components of the reagent system: triethylorthoformate, phenyldimethoxycarboniofluoborate and polymer are identical to those in Example 8.

Heating of the reactor by circulation of fluid thermostatically controlled at 165°C is commenced and the pressure in the system is regulated so that the inside temperature is around 155°C.

The very fluid suspension is maintained at that temperature for 30 minutes, after which cooling commences.

The suspension is finally transferred to the steel filter with rapid filtering. The polymer left on the filter is washed thoroughly with toluene containing 1 percent by weight of triethylamine and then with toluene only.

The moist powder is dried in a vacuum oven at 60°C and 297.9 g of product are recovered. The tests described in Example 8 are carried out on the polymer (POM 3). The results are listed in Table 3.

EXAMPLE 11

1,080 g of a mixture of linear paraffins described in Example 3, 360 g of N,N'-dimethylformamide, 180 g of triethylorthoformate, 480 g of polyacetal and 2,916 g of phenyldimethoxycarboniofluoborate are placed in the reactor using the method previously described. The following components of the reagent system: triethylorthoformate, N,N'-dimethylformamide, phenyldimethoxycarboniofluorborate and polymer are identical to those used in Example 8.

Heating of the reactor by means of a circulation of fluid thermostatically controlled at 165°C is commenced and the pressure in the system is so regulated that the internal temperature is around 155°C. The very fluid suspension is maintained at that temperature for 30 minutes and then it is cooled. The suspension is easily transferred to the steel filter and is rapidly filtered. The liquid recovered in the collecting vessel, when cold, forms two layers, an upper paraffin layer and a lower layer containing the solvent. The granular polymer is washed thoroughly, first with toluene containing 1 percent by weight of triethyl amine and then with toluene only. The powder is dried at 60°C in a vacuum oven so that 427.9 g of product are recovered and are subjected to the tests described in Example 8.

The results (POM 4) of the test are shown in Table 3. T,450

EXAMPLE 12

135 g trimethylorthoformate, 270 g N,N'-dimethylacetamide, 810 g n-heptane, 1,055 g trifluoroboronetherate and 450 g polyacetal are placed in the reactor using the methods previously described. The polymer is that described in Example 8. Heating of the reactor by circulation of fluids thermostatically controlled at 160°C is commenced and the pressure in the system is increased so that the internal temperature is 150° to 152°C. The highly fluid and easily stirred suspension is maintained at this temperature for 30 minutes after which the cooling phase is commenced, the pressure being gradually reduced.

The suspension is rapidly transferred to the steel filter and the polymer is squeezed out.

The liquid recovered in the collecting vessel, at ambient temperature, forms two layers, the upper paraffin layer and the lower layer containing the solvent.

The granular powder left on the filter is washed thoroughly with toluene containing 1 percent by weight of triethylamine and then with toluene only.

The moist powder is dried in a vacuum oven at 60°C and 427.5 g of product are recovered. The tests described in Example 8 are carried out on the polymer (POM 5). The results of the tests are shown in Table 4.

EXAMPLE 13

135 g trimethylorthoformate, 270 g of pure N,N'-dimethylacetamide, 810 g of anhydrous n-heptane, 450 g polyacetal and 1.45 g of boron trifluoride etherate are placed in the reactor using the methods previously described. The polymer is that described in Example 8. Heating of the reactor by circulation of fluid at 160°C is commenced and the pressure in the system is increased so that the internal temperature is 150° to 152°C.

The fluid suspension is maintained at this temperature for 30 minutes, after which the cooling phase commences, the pressure being gradually reduced. The suspension is easily transferred to the steel filter and the filtered polymer is squeezed out.

The liquid recovered in the collecting vessel, at ambient temperature, forms two layers, the upper paraffin layer and the lower layer containing the solvent.

The granular powder left on the filter is washed thoroughly with toluene containing 1 percent by weight of triethylamine and with toluene only.

Drying is carried out in a vacuum oven at 60°C and 426 g of porduct are recovered.

The tests described in Example 8 are carried out on the polymer (POM 6) and the results are listed in Table 4.

EXAMPLE 14

450 g of triethylorthoformate, 900 g of nitrobenzene, 900 g of n-paraffin, 450 g of polyacetal and 2.70 g paranitrobenzenediazofluoborate are placed in the reactor using the methods previously described.

The polymer is the same as that used in Example 8 while the n-paraffins are the same as those described in Example 3. Heating of the reactor is commenced, by circulation of fluid at 160°C, the pressure in the system being so regulated that the temperature is 150° to 152°C. The fluid suspension is maintained under these conditions for 60 minutes, after which the cooling phase is commenced.

The reaction mixture is transferred to the steel filter and the filtered polymer is squeezed out. The liquid recovered in the collecting vessel, when cold, forms two layers, the upper layer consisting of non-solvent while the lower layer comprises the solvent. The granular powder left on the filter is washed thoroughly with toluene containing 1 percent triethylamine and then with toluene only.

The damp product is dried in a vacuum oven at 60°C and 406.8 g of polymer are recovered. The tests described in Example 8 are carried out on the polymer (POM 7) and the results are listed in Table 4.

EXAMPLE 15

225 g methylal, 360 g of dimethylsulphoxide, 1,665 g of dodecylbenzene with a linear alkyl chain, 450 g of polyacetal and 1.79 g of ammoniumfluoborate are placed in the reactor, using the methods previously described.

The polymer is the same as that described in Example 8.

Heating of the reactor by circulation of fluid at 160°C is commenced and the pressure in the system is raised so that the temperature is maintained at 148° to 150°C.

These conditions are maintained for 45 minutes after which cooling commences.

The suspension is easily transferred to the steel filter through which it is rapidly filtered.

The liquid recovered, when cold, forms two layers: an upper hydrocarbon layer and a lower layer containing the solvent.

The powder is thoroughly washed with toluene containing 1 percent by weight of triethylamine and then again with toluene.

The moist product is dried in a vacuum oven at 60°C and 430.2 g of polymer are recovered and subjected to the tests described in Example 8. The results (POM 8) are listed in Table 4.

Table 4

| Examples | POM 5 | POM 6 | POM 7 | POM 8 |
|---|---|---|---|---|
| Yield (% by weight) | 93.0 | 94.7 | 90.5 | 95.6 |
| d (g/ml) | 0.63 | 0.63 | 0.61 | 0.63 |
| $\eta_{in}$ | 1.78 | 1.50 | 1.61 | 1.45 |
| $K_{220}$ | 0.18 | 0.10 | 0.12 | 0.11 |
| FAS (% by weight) | 95.4 | 98.4 | 96.9 | 97.8 |
| $\eta_{in}$ (FAS) | 1.77 | 1.52 | 1.63 | 1.45 |
| $K_{220}$ (FAS) | 0.05 | 0.04 | 0.05 | 0.05 |

What we claim is:

1. Process for stabilising polyacetals of a molecular weight above 10,000 containing residues of one or more aldehydes with or without residues of non-aldehydic co-monomers by reaction of the terminal hydroxyl groups of the macromolecule with a blocking reagent, wherein the improvement comprises bringing said reagent into contact with the polyacetal suspended in a reaction medium which is liquid under the working conditions, the said reaction medium comprising at least one substance which is inert vis-a-vis the other constituents of the reaction mixture, is not solvent vis-a-vis the polymer and is liquid under the reaction conditions, and at least one substance which is solvent with respect to the polymer and the reagent and which is liquid under the reaction conditions, the said solvent and non-solvent substances being completely miscible under the conditions in which reaction takes place, but immiscible or partially miscible at temperatures substantially below the reaction temperatures, said blocking reagent being selected from anhydrides of carboxylic acids, isocyanates, isothiocyanates, orthoesters, and ethers, the ratio by weight of solvent to non-solvent substances being maintained at between approximately 0.05 : 1 to 1 : 1, a ratio by weight of polyacetal to the total of solvent and non-solvent substances of 1 : 0.5 to 1 : 10 being maintained.

2. Process according to claim 1, characterised in that the solvent substance consists of the reagent used for blocking the terminal hydroxyl groups of the polyacetal.

3. Process according to claim 1, characterised in that the reaction to block the terminal hydroxyl groups of the polyacetal takes place at a temperature equal to or greater than that at which the polyacetal dissolves in the solvent substance containing the reagent (in the absence of a non-solvent substance), or in the reagent when this functions as a solvent (also in the absence of the non-solvent substance), when the ratio by weight of solvent to polyacetal is greater than 5, but below the melting temperature of the polyacetal.

4. Process according to claim 1, characterised in that an anhydride selected from those of acetic, propionic and butyric acids is used as the reagent.

5. Process according to claim 1, characterised in that an isocyanate, selected from phenylisocyanate and p-toluene isocyanate is used as the reagent.

6. Process according to claim 1, characterised in that an isothiocyanate, selected from phenylisothiocyanate, alphamethylisothiocyanate, p-toluene-isothiocyanate and N,N'-dimethylsulphamide-p-phenylisothiocyanate is used as the reagent.

7. Process according to claim 1, characterised in that the solvent for the polyacetal is selected from substituted amides such as dimethylformamide and dimethylacetamide; aromatic nitroderivatives such as nitrobenzene; lactones such as gammabutyrolactone; ketones such as methylisobutylketone, esters such as butyl acetate, isobutylacetate and methylene glycol diacetate; and sulphoxides such as dimethylsulphoxide.

8. Process according to claim 1, characterised in that the substance which is not solvent with respect to the polyacetal is selected from saturated aliphatic hydrocarbons having a linear or branched hydrocarbon chain, cyclo aliphatic hydrocarbons and alkyl aromatic hydrocarbons in which the alkyl chain, linear or branched, contains at least 6 carbon atoms.

9. Process according to claim 1, characterised in that the said non-solvent substance is selected from linear paraffin hydrocarbons having from 6 to 20 carbon atoms per molecule, alkylbenzenes having linear or branched paraffin chain of 8 to 20 carbon atoms, and cyclohexane.

10. Process according to claim 1, characterised in that the reaction to block the terminal hydroxyl groups of the polyacetal takes place at temperatures of 130° to 185°C.

11. Process according to claim 1, in which the reaction to block the terminal hydroxyl groups of the polyacetals takes place over a period of from 1 to 60 minutes.

12. process according to claim 1, in which the reaction to block the terminal hydroxyl groups of the polyacetals takes place in the presence of various additives, stabilisers or catalysts.

13. Process according to claim 1, characterised in that the terminal hydroxy groups of the polyacetal are etherified.

14. process according to claim 13, characterised in that the blocking reagent is selected from methyl or ethyl orthoesters such as orthoformates, orthoacetates and orthocarbonates; epoxides such as ethylene oxide or propylene oxide; acyclic ethers such as dimethyl ether; cyclic ethers such as tetrahydrofuoran; and acetals such as methylal, 1,1-diethyoxyethane, 1,2-glycerylformal and tetramethylglyoxyacetal.

15. Process according to claim 13, characterised in that the solvent substance consists of the reagent used to etherify the terminal hydroxyl groups of the polyacetals.

16. Process according to claim 13, characterised in that the solvent substance is selected from substituted amides such as dimethylformamide and dimethylacetamide; aromatic nitroderivatives such as nitrobenzene; sulphoxides such as dimethylsulphoxide; and nitriles.

17. Process according to claim 13, characterised in that the non-solvent substance is selected from saturated aliphatic hydrocarbons having a linear or branched hydrocarbon chain, cycloaliphatic hydrocarbons, and alkylaromatic hydrocarbons in which the alkyl chain, linear or branched, contains at least 6 carbon atoms.

18. Process according to claim 13, characterised in that the non-solvent substance is selected from linear paraffins having from 6 to 20 carbon atoms per molecule and alkyl benzenes having 8 to 20 carbon atoms in the alkyl chain.

19. Process according to claim 13, characterised in that the etherification reaction takes place in a range of temperatures the upper limit of which is constituted by the melting point of the polyacetal while the lower limit corresponds to the temperature at which immiscibility between the solvent and non-solvent substances becomes manifest.

20. Process according to claim 13, characterised in that etherification takes place at a temperature from 130° to 185°C.

21. Process according to claim 13, characterised in that the etherification reaction is carried out in the presence of a catalyst comprising a Lewis type acid.

22. Process according to claim 13, characterised in that the catalyst is selected from boron trifluoride, boron trifluoride etherate, p-nitrobenzenediazofluoborate and phenyldimethoxycarboniofluoborate.

23. Process according to claim 13, characterised in that the etherification reaction times are comprised in the range from 1 to 60 minutes.

* * * * *